US012600383B2

(12) United States Patent
Schneider et al.

(10) Patent No.: US 12,600,383 B2
(45) Date of Patent: Apr. 14, 2026

(54) DEVICE AND METHOD FOR GENERATING AND TRANSMITTING CONTROL COMMANDS FOR AN AUTONOMOUSLY DRIVING MOTOR VEHICLE

(71) Applicant: Volkswagen Aktiengesellschaft, Wolfsburg (DE)

(72) Inventors: Eugen Schneider, Wolfsburg (DE); Hartmut Voge, Rötgesbüttel (DE); Timo Dobberphul, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 191 days.

(21) Appl. No.: 18/578,288

(22) PCT Filed: Jul. 14, 2022

(86) PCT No.: PCT/EP2022/069783
§ 371 (c)(1),
(2) Date: Jan. 10, 2024

(87) PCT Pub. No.: WO2023/285613
PCT Pub. Date: Jan. 19, 2023

(65) Prior Publication Data
US 2025/0282388 A1     Sep. 11, 2025

(30) Foreign Application Priority Data
Jul. 16, 2021     (DE) .......................... 102021207578.9

(51) Int. Cl.
*B60W 60/00*        (2020.01)
*B60W 30/18*        (2012.01)
(52) U.S. Cl.
CPC ................. *B60W 60/00186* (2020.02); *B60W 30/18009* (2013.01); *B60W 2520/00* (2013.01);
(Continued)

(58) Field of Classification Search
None
See application file for complete search history.

(56) References Cited

U.S. PATENT DOCUMENTS

2017/0277153 A1* 9/2017 Samii ....................... G05B 9/03
2019/0056735 A1* 2/2019 Koopman ........... B60W 50/023
(Continued)

FOREIGN PATENT DOCUMENTS

DE      102017218395 A1 * 4/2018 .......... B60W 50/029

OTHER PUBLICATIONS

PCT/EP2022/069783. International Preliminary Report on Patentability / Written Opinion (Jan. 16, 2024).
(Continued)

*Primary Examiner* — Peter D Nolan
*Assistant Examiner* — Jacob Kent Besteman-Street
(74) *Attorney, Agent, or Firm* — Peter Zura; LOZA & LOZA, LLP

(57) ABSTRACT

Technologies and techniques for generating and transmitting control commands for an autonomously driving motor vehicle. A device receives at least surroundings data and vehicle status data, calculates a trajectory on the basis of said data, calculates the control commands required for the implementation of the trajectory and transmits them to at least one actuator. The device includes four sub-systems, wherein a first and a third sub-system operate as master and a second and a fourth sub-system operate as slave. Each of the first/second sub-system receives at least surroundings data and vehicle status data and the third/fourth sub-system transmit at least the control commands to at least one actuator. At least the first/third sub-system are designed to be fail-silent; if individual faults occur in a sub-system, at least one control command is to be generated and transmitted in order to bring the motor vehicle into a safe state.

20 Claims, 2 Drawing Sheets

(52) U.S. Cl.
  CPC ..... *B60W 2530/00* (2013.01); *B60W 2552/00*
      (2020.02); *B60W 2554/00* (2020.02); *B60W*
      *2555/00* (2020.02); *B60W 2720/24* (2013.01)

(56) References Cited

U.S. PATENT DOCUMENTS

| | | | |
|---|---|---|---|
| 2019/0079513 A1* | 3/2019 | Greenfield | G06F 11/20 |
| 2021/0328760 A1* | 10/2021 | Kopetz | H04Q 9/00 |
| 2022/0255473 A1* | 8/2022 | Tomizawa | B62D 5/04 |
| 2023/0027577 A1* | 1/2023 | Naderhirn | G05D 1/0214 |
| 2024/0270263 A1* | 8/2024 | Neumann | G05D 1/0077 |

OTHER PUBLICATIONS

Stott et al. "Comparing Fail-Silence Provided by Process Duplication versus Internal Error Detection for DHCP Server." Proceedings 15th International Parallel and Distributed Processing Symposium. IPDPS 2001, San Francisco, CA, USA, doi: 10.1109/IPDPS.2001. 924966 (Apr. 2001).
PCT/EP2022/069783. International Search Report (Dec. 21, 2022).
Ishigooka. "Cost-Effective Redundancy Approach for Fail-Operational Autonomous Driving System." 2018 IEEE 21st International Symposium on Real-Time Distributed Computing (ISORC), Singapore, 2018, pp. 107-115, doi: 10.1109/ISORC.2018.00023.
Speirs. "Fault Injection Based Assessment of Fail-Silence Provided by Process Duplication versus Internal Error Detection." Newcastle University, Department of Computing Science, University of Newcastle upon Tyne (UK). URL: http://www.cs.ncl.ac.uk/publications/trs/papers/694.pdf (Jan. 1, 2000).

* cited by examiner

DEVICE AND METHOD FOR GENERATING AND TRANSMITTING CONTROL COMMANDS FOR AN AUTONOMOUSLY DRIVING MOTOR VEHICLE

RELATED APPLICATIONS

The present application claims priority to International Patent Application No. PCT/EP2022/069783 to Schneider et al., filed Jul. 14, 2022, titled "Device and Method for Generating and Transmitting Control Commands for an Autonomously Driving Motor Vehicle," which claims priority to German Pat. App. No. DE 10 2021 207 578.9, filed Jul. 16, 2021, to Schneider, et al., the contents of each being incorporated by reference in their entirety herein.

TECHNICAL FIELD

The present disclosure relates to a device and a method for generating and transmitting control commands for an autonomously driving motor vehicle.

BACKGROUND

Devices of this type must be fault-tolerant with regard to individual faults, i.e., the device must be able, for example, to bring the motor vehicle to a safe standstill or to continue to guide it safely in some other way. Such maneuvers are also known as limb home, limb aside or break in lane. One possible approach is full redundancy, e.g., two systems working in parallel.

SUMMARY

The present disclosure is based on the technical problem of creating an improved device for generating control commands for an autonomously driving motor vehicle, and of making available a suitable method.

The technical problem is solved by a device with the features of the independent claims recited below. Further advantageous configurations of the invention result from the dependent claims.

In some examples, a device is disclosed for generating and transmitting control commands for an autonomously driving motor vehicle is designed in such a way that it receives at least environment data and vehicle status data, calculates at least one trajectory therefrom, calculates the control commands required for the implementation of the trajectory for at least one actuator and transmits it to the at least one actuator, whereby the device comprises at least a first sub-system, a second sub-system, a third sub-system and a fourth sub-system. The first sub-system and the third sub-system work as masters and the second sub-system and the fourth sub-system work as slaves, whereby the first sub-system and the second sub-system are connected via at least one data connection and the third sub-system and the fourth sub-system are connected to one another via a further data connection are connected, whereby the first sub-system and the third sub-system are additionally connected to one another via at least one data connection and the second sub-system and the fourth sub-system are connected to one another via a data connection. The first sub-system and the second sub-system each receives at least environment data and vehicle status data and the third sub-system and the fourth sub-system transmit at least the control commands to the at least one actuator, whereby at least the first sub-system and the third sub-system are designed to be fail-silent, whereby the device is further designed such that in the event of individual faults in a sub-system, at least one control command is generated and transmitted to bring the motor vehicle in a safe state.

In some examples, the first to fourth sub-systems can also be viewed as nodes in a network. The surrounding data can come from an environmental sensor system in the vehicle, which has cameras and/or radar sensors and/or lidar sensors and/or ultrasonic sensors, for example. Alternatively, or additionally, the surroundings data can come from external sensors of a traffic infrastructure and/or from other motor vehicles. The vehicle status data are in particular the location, speed and direction of the autonomously driving motor vehicle. The first sub-system and the second sub-system can receive the same surrounding data and/or vehicle status data or data from different data sources. The fact that the first sub-system and the third sub-system are fail-silent means that they are "silent" in the event of a fault and no longer participate in the communication. A first power supply is preferably assigned to the first and third sub-systems and a second power supply is assigned to the second and fourth sub-systems, the first and second power supplies being independent of one another. However, it is also possible to assign each sub-system its own, independent power supply.

Using a master-slave configuration, the third and fourth sub-systems can control the same actuator system without conflicts occurring, while the ring structure ensures that the control commands can always be calculated and transmitted. The safe state also means that the motor vehicle can continue to drive autonomously (either for a limited distance or with limited performance or speed).

The first and second sub-systems preferably each calculate the at least one trajectory and more preferably also the control commands, with the third and fourth sub-system are responsible only for the transmission to the actuators. As a result, they can then be configured very simply and robustly.

In one embodiment, the second and/or fourth sub-system may also be configured to be fail-silent, so that the relevant monitoring by the master can be omitted. Different realizations of fail-silent are possible. Different realizations can also be made in the sub-systems. Thus, for example, a watchdog circuit with a hardwired AND connection (aka shutoff path) can be used, with the watchdog also being able to be arranged in a sub-controller that monitors a main controller.

In some examples, the device may be configured such that in the event of a double fault that does not affect at least the third sub-system or the fourth sub-system, a control command for an emergency stop is generated by the third sub-system or the fourth sub-system.

In a further example, the device may be configured in such a way that, in fault-free operation, the control commands for the actuators are calculated and transmitted by the second or fourth sub-system. In this case, the second and fourth sub-systems can be designed with higher computing power compared to the first and third sub-systems. The first and third sub-systems can then be designed to be simpler in structure, so that their reliability and fail-safety are increased accordingly.

In a further example, the first sub-system may be additionally connected to the fourth sub-system and/or the second sub-system is connected to the third sub-system. In this way, on the one hand, data traffic can be accelerated in the event of a fault.

In a further example, the third sub-system and the fourth sub-system each include at least two separate sub-systems. The sub-systems are, for example, control units for a steering, braking, drive or transmission system.

With regard to the procedural design of the invention, reference is made in full to the contents of the present disclosure.

DESCRIPTION OF THE DRAWINGS

Aspects of the present disclosure are explained in more detail below using preferred exemplary embodiments. The figures show.

DETAILED DESCRIPTION

Figure 1:
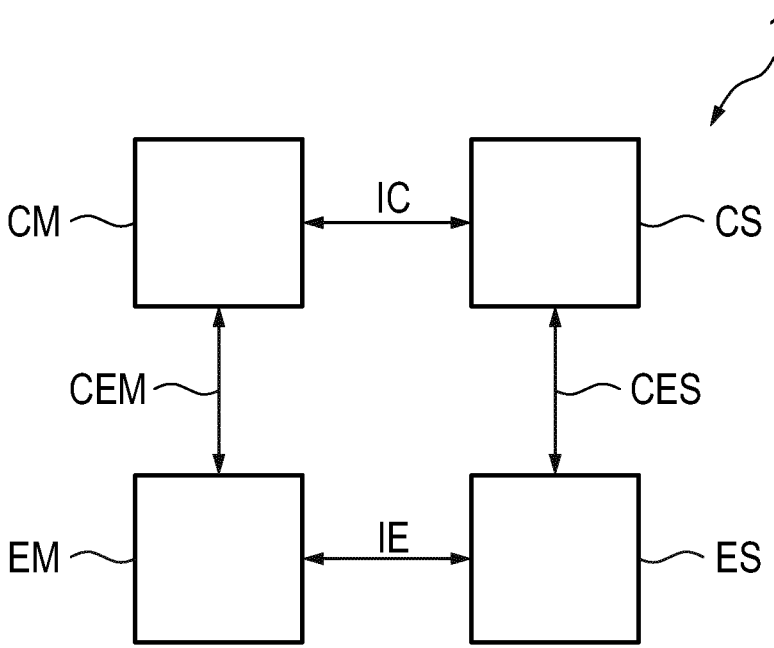
FIG. 1 illustrates a schematic representation of a device for generating control commands for an autonomously driving motor vehicle according to some aspects of the present disclosure.

FIG. 1 shows a device 1 for generating control commands for an autonomously driving motor vehicle. The device 1 comprises a first sub-system CM (Commander Master), a second sub-system CS (Commander Slave), a third sub-system EM (Executor Master) and a fourth sub-system ES (Executor Slave). The first sub-system CM and the second sub-system CS are connected to one another via a data connection IC (Inter Commander). Likewise, the third sub-system EM and the fourth sub-system ES are connected to one another in terms of data technology via a data connection IE (Inter Executor Connection). Furthermore, the first sub-system CM and the third sub-system EM are connected to one another via a data connection CEM (Commander- Executor Connection Master). Finally, the second sub-system CS and the fourth sub-system ES are connected to one another via a data connection CES (Commander-Executor Connection Slave). All four sub-systems CM, CS, EM and ES are designed to be fail-silent.

The first sub-system CM and second sub-system CS receive surrounding data and vehicle status data and use them to calculate a respective trajectory. The two sub-systems CM, CS can receive the same data or they can receive the data from different sensor systems or data sources. The sensor systems or data sources can be on the vehicle and/or external. The first sub-system CM transmits its trajectory to the third sub-system EM via the data connection CEM and the second sub-system CS transmits its trajectory to the fourth sub-system ES. The third and fourth sub-systems EM, ES then each calculate control commands for the actuators. In fault-free operation, preferably only the control commands of the fourth sub-system ES are used to control the actuators. Alternatively, the first sub-system CM and the second sub-system CS can also calculate the control commands and then transmit the control commands to the third sub-system (EM) or fourth sub-system (ES), which then transmit the control commands to the actuators.

There are basically three types of control commands, namely control commands SB for fault-free operation, control commands SSS (System Safe State) to transfer the motor vehicle to a safe state in the event of a single fault, and control commands ESS (Executor Safe State) for an emergency stop, which are generated only by the third or fourth sub-system EM, ES. In fault-free normal operation, the data from the second and fourth sub-systems CS, ES are used to control the motor vehicle. In the event of a single fault, a control command SSS can always be initiated and implemented due to the structure, which is shown in the table below.

| fault | faulty component | detected by | response for SSS | control path | further response for ESS, if due to double faults no SSS is detected |
|---|---|---|---|---|---|
| — | — | — | — | CS-CES-ES | — |
| Failure | CM | CS, EM | CS initiates SSS | CS-CES-ES | EM initiates ESS |
| | CS | CM, ES | CM initiates SSS<br>EM switches on CEM | CM-CEM-EM | EM initiates ESS |
| | EM | CM, ES | CM informs CS<br>ES informs CS<br>ES acts alone<br>CS initiates SSS | CS-CES-ES | ES initiates ESS |
| | ES | CS, EM | CS informs CM<br>EM informs CM<br>EM switches on CEM<br>CM/CS switches on CEM<br>CS initiates SSS | CS-IC-CM-CEM-EM | EM initiates ESS |
| | IC | CM, CS | CM initiates SSS<br>CS initiates SSS<br>EM switches on CEM | CM-CEM-EM | EM initiates ESS |
| | CEM | CM, EM | CM informs CS<br>CS initiates SSS | CS-CES-ES | EM initiates ESS |
| | CES | CS, ES | CS informs CM<br>CM/CS switches on CEM<br>CS initiates SSS<br>EM switches on CEM | CS-IC-CM-CEM-EM | EM initiates ESS |
| | IE | EM, ES | EM informs CM<br>ES informs CS<br>CM/CS switches on CEM<br>EM switches on CEM<br>ES acts alone<br>CS initiates SSS | CS-IC-CM-CEM-EM | ES initiates ESS |

-continued

| fault | faulty component | detected by | response for SSS | control path | further response for ESS, if due to double faults no SSS is detected |
|---|---|---|---|---|---|
| | DC-Master (power supply) | CS, ES | CS initiates SSS ES acts alone | CS-CES-ES | ES initiates ESS |
| | DC-Master (power supply) | CM, EM | CM initiates SSS EM switches on CEM | CM-CEM-EM | EM initiates ESS |
| | CM and CS | EM, ES | double fault | | EM initiates ESS |
| | CM and CES | EM, ES | double fault | | EM initiates ESS |
| | EM and ES | | double fault, not possible | | |
| faulty operation | CM | CM | CM switches on CS initiates SSS | CS-CES-ES | EM initiates ESS |
| | CS | CS (algorithmic) | CS switches on CM initiates SSS EM switches on CEM | CM-CEM-EM | EM initiates ESS |
| | CS | CM (semantic) | CM initiates SSS EM switches on CEM | CM-CEM-EM | EM initiates ESS |
| | EM | EM | EM switches on CM informs CS ES informs CS ES acts alone CS initiates SSS | CS-CES-ES | ES initiates ESS |
| | ES | ES | ES switches on EM informs CM EM switches on CEM CM/CS switches on CEM CS initiates SSS | CS-IC-CM-CEM-EM | EM initiates ESS |
| | CM and CS | EM, ES | double fault | | EM initiates ESS |
| | EM and ES | | double fault, not possible | | |

Figure 2:
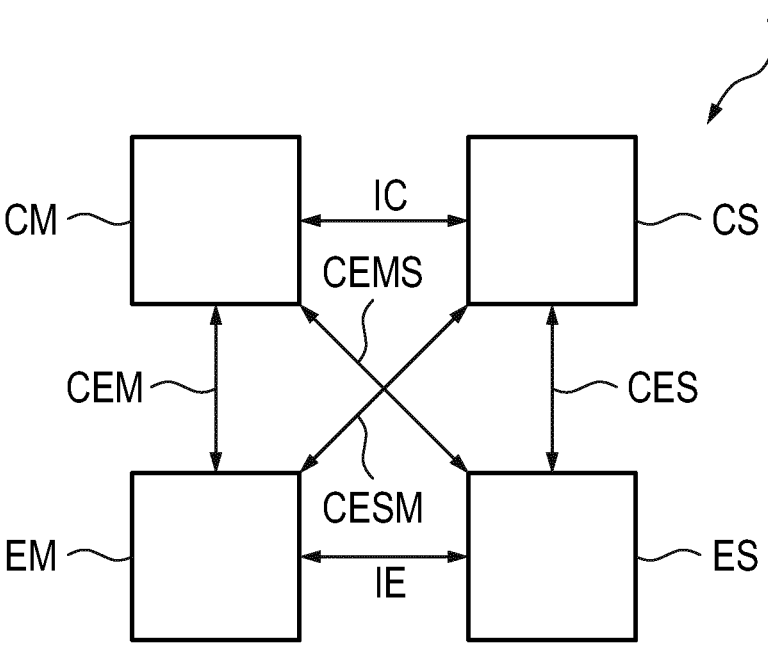
FIG. 2 illustrates another schematic representation of a device, according to some aspects of the present disclosure.

Based on the table, the functions of the individual sub-systems and their connections have become even clearer and can be summarized as follows:

First sub-system CM: checks the second sub-system CS and the third sub-system EM, transmits commands to the third sub-system EM and generates commands for control commands SSS if necessary;

Second sub-system CS: checks first sub-system CM and fourth sub-system ES, generates control commands for normal operation or control commands SSS, if necessary;

Third sub-system EM: checks first sub-system CM and fourth sub-system ES, decides which control path is used, executes control commands ESS if necessary;

Fourth sub-system ES: checks the third sub-system EM and second sub-system CS, transmits slave commands to the third sub-system and executes commands from the third sub-system, executes control commands from the second sub-system CS in normal operation and executes control commands ESS alone if the master EM is not present;

Connection IC: CM→CS: transmits the status of the first sub-system CM and the third sub-system EM to the second sub-system CS;

CS→CM: transmits the status of the second sub-system CS and the fourth sub-system ES to the first sub-system, transmits commands and status information on control commands SSS to the first sub-system;

Connection IE: EM→ES: transmits status from the third sub-system, decides on the execution of the control commands from the third or the fourth sub-system;

ES→EM: transmits status from fourth and second sub-system, status of control commands SSS from second sub-system, commands from second sub-system;

Connection CEM: CM→EM: status of the first sub-system, status of the control commands SSS, control commands;

EM→CM: status of the third and fourth sub-systems;

Connection CES: CS→ES: status of the second sub-system, status of the control commands SSS, control commands;

ES→CS: status of the third and fourth sub-systems;

FIG. 2 shows an alternative embodiment that has two additional data connections, namely a data connection CEMS between the first sub-system CM and the fourth sub-system ES and a data connection CESM between the second sub-system CS and the third sub-system EM. This enables a direct exchange of status signals and control commands between these sub-systems, which speeds up the process.

Figure 3:
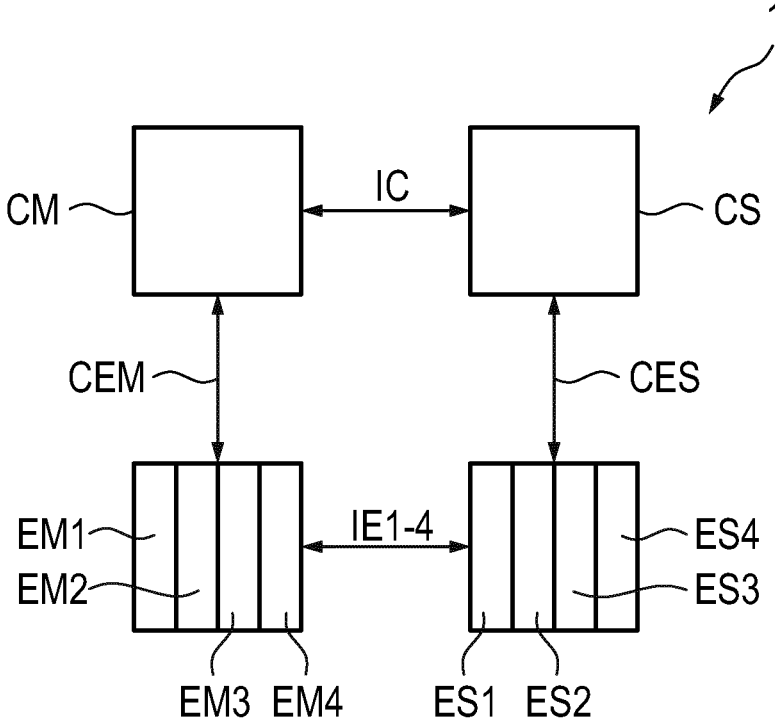
FIG. 3 illustrates another schematic representation of a device, according to some aspects of the present disclosure.

A further alternative embodiment of the device 1 is shown in FIG. 3. The third and fourth sub-systems each consist of separate sub-systems EM1-EM4 and ES1-ES4. For example, the two sub-systems EM1 and ES1 are used to control a steering actuator or steering system, the sub-systems EM2 and ES2 are used to control a brake actuator or brake system, etc. The data connection IE can also be divided into data connections IE1-IE4, as shown. The advantage is then that the device 1 can be expanded more easily.

The invention claimed is:

1. A device for generating and transmitting control commands for an autonomous motor vehicle, comprising:

a first sub-system, configured as a master;

a second sub-system, configured as a slave, and operatively coupled to the first sub-system;

a third sub-system, configured as a master, and operatively coupled to the first sub-system; and a fourth sub-system, configured as a slave, and operatively coupled to the second sub-system and the third sub-system, wherein the first sub-system and the second sub-system each receive at least surrounding data and vehicle status data, and wherein the third sub-system and the fourth sub-system are configured to transmit control commands for implementing a trajectory of the vehicle to at least one actuator, and wherein at least the first sub-system and the third sub-system are configured to be fail-silent, wherein, in the event of individual faults in any of the sub-systems, a control command is generated and transmitted to bring the motor vehicle into a safe state.

2. The device according to claim 1, wherein the first sub-system and the second sub-system are configured to each calculate at least one trajectory.

3. The device according to claim 2, wherein the first sub-system and the second sub-system are configured to calculate the control commands for the at least one actuator.

4. The device according to claim 1, wherein the second sub-system and/or the fourth sub-system are configured to be fail-silent.

5. The device according to claim 1, wherein, when a double fault is detected that does not affect at least the third sub-system or the fourth sub-system, a control command for an emergency stop is generated by the third sub-system or the fourth sub-system.

6. The device according to claim 1, wherein the control commands for the actuators are calculated and transmitted by the second sub-system and the fourth sub-system during a fault-free operation.

7. The device according to claim 1, wherein the first sub-system is further coupled to the fourth sub-system, and/or the second sub-system is further coupled to the third sub-system.

8. The device according to claim 1, wherein the third sub-system and the fourth sub-system each comprise at least two separate sub-systems.

9. A method for generating and transmitting control commands for an autonomous motor vehicle, comprising:

configuring a first sub-system and a third sub-system as a fail-silent master;

configuring a second sub-system and a fourth sub-system as a slave, the fourth sub-system being operatively coupled to the second sub-system and the third sub-system;

receiving at least surrounding data and vehicle status data in the first sub-system and second sub-system;

transmitting control commands via the third sub-system and the fourth sub-system for implementing a trajectory of the vehicle to at least one actuator; and generating and transmitting a control command to bring the motor vehicle into a safe state in the event of individual faults in any of the sub-systems.

10. The method according to claim 9, wherein the first sub-system and the second sub-system are configured to each calculate at least one trajectory.

11. The method according to claim 10, wherein the first sub-system and the second sub-system are configured to calculate the control commands for the at least one actuator.

12. The method according to claim 9, wherein the second sub-system and/or the fourth sub-system are configured to be fail-silent.

13. The method according to claim 9, further comprising generating a control command for an emergency stop via the third sub-system or the fourth sub-system when a double fault is detected that does not affect at least the third sub-system or the fourth sub-system.

14. The method according to claim 9, wherein the control commands for the actuators are calculated and transmitted by the second sub-system and the fourth sub-system during a fault-free operation.

15. The method according to claim 9, wherein the third sub-system and the fourth sub-system each comprise at least two separate sub-systems.

16. A device for generating and transmitting control commands for an autonomous motor vehicle, comprising:

a first sub-system, configured as a fail-silent master;

a second sub-system, configured as a slave;

a third sub-system, configured as a fail-silent master; and a fourth sub-system, configured as a slave, and operatively connected to the second sub-system and the third sub-system, wherein the first sub-system and the second sub-system each receive at least surrounding data and vehicle status data, and wherein the third sub-system and the fourth sub-system are configured to transmit control commands for implementing a trajectory of the vehicle to at least one actuator, wherein the third sub-system and the fourth sub-system are further configured to selectively generate and transmit control commands that place the motor vehicle into a safe state independently of continued operation of at least one of the first sub-system and the second sub-system.

17. The device according to claim 16, wherein the first sub-system and the second sub-system are configured to each calculate at least one trajectory.

18. The device according to claim 17, wherein the first sub-system and the second sub-system are configured to calculate the control commands for the at least one actuator.

19. The device according to claim 16, wherein the second sub-system and/or the fourth sub-system are configured to be fail-silent.

20. The device according to claim 16, wherein, when a double fault is detected that does not affect at least the third sub-system or the fourth sub-system, a control command for an emergency stop is generated by the third sub-system or the fourth sub-system.

*    *    *    *    *